United States Patent
Peterson

(10) Patent No.: US 8,307,334 B2
(45) Date of Patent: *Nov. 6, 2012

(54) METHOD FOR ASSISTING A USER IN THE PROCESS OF CREATING SOFTWARE CODE

(75) Inventor: Trenten Peterson, Florence, TX (US)

(73) Assignee: International Business Machines Corporation, Armonk, NY (US)

( * ) Notice: Subject to any disclaimer, the term of this patent is extended or adjusted under 35 U.S.C. 154(b) by 1115 days.

This patent is subject to a terminal disclaimer.

(21) Appl. No.: 11/856,515

(22) Filed: Sep. 17, 2007

(65) Prior Publication Data

US 2009/0077534 A1   Mar. 19, 2009

(51) Int. Cl.
G06F 9/44   (2006.01)
(52) U.S. Cl. ...................................................... 717/110
(58) Field of Classification Search .................. 717/111, 717/110

See application file for complete search history.

(56) References Cited

U.S. PATENT DOCUMENTS

| | | | | |
|---|---|---|---|---|
| 5,485,618 A * | 1/1996 | Smith | ........................... | 715/710 |
| 5,760,788 A * | 6/1998 | Chainini et al. | ............... | 345/474 |
| 5,812,840 A | 9/1998 | Shwartz | | |
| 5,911,070 A * | 6/1999 | Solton et al. | .................. | 717/105 |
| 5,924,089 A * | 7/1999 | Mocek et al. | .......................... | 1/1 |
| 6,026,233 A * | 2/2000 | Shulman et al. | ............... | 717/113 |
| 6,163,879 A * | 12/2000 | Mackey | ......................... | 717/111 |
| 6,260,035 B1 | 7/2001 | Horvitz et al. | | |
| 6,285,998 B1 | 9/2001 | Black et al. | | |
| 6,314,559 B1 * | 11/2001 | Sollich | ........................... | 717/111 |
| 6,671,691 B1 * | 12/2003 | Bigus | .................................... | 1/1 |
| 6,851,107 B1 * | 2/2005 | Coad et al. | ...................... | 717/108 |
| 7,370,315 B1 * | 5/2008 | Lovell et al. | ................... | 717/100 |
| 7,428,536 B2 * | 9/2008 | McGuire et al. | ...................... | 1/1 |
| 2005/0015368 A1 * | 1/2005 | Payton et al. | ...................... | 707/4 |
| 2005/0125773 A1 * | 6/2005 | Hawley et al. | ................ | 717/109 |
| 2005/0278695 A1 * | 12/2005 | Synovic | ......................... | 717/112 |
| 2006/0156086 A1 | 7/2006 | Flynn et al. | | |
| 2007/0209031 A1 * | 9/2007 | Ortal et al. | ..................... | 717/104 |
| 2008/0320438 A1 * | 12/2008 | Funto et al. | .................... | 717/106 |

\* cited by examiner

*Primary Examiner* — Wei Zhen
*Assistant Examiner* — Kevin Dothager
(74) *Attorney, Agent, or Firm* — Douglas H. Lefeve; Edell, Shapiro & Finnan, LLC

(57) ABSTRACT

A method for assisting a user in creating software code. In one implementation, the method includes receiving user input editing software code through a code editor, in which the software code is associated with a programming language having a plurality of software constructs. The method further includes receiving user input invoking a code assistant associated with the code editor. The code assistant comprises a plurality of panels that correspond to the plurality of software constructs. One or more of the plurality of panels contain a set of user-selectable options associated with a given software construct to assist the user in editing the software code.

9 Claims, 10 Drawing Sheets

METHOD FOR ASSISTING A USER IN THE PROCESS OF CREATING SOFTWARE CODE

FIELD OF THE INVENTION

This application is related to U.S. application Ser. No. 11/856,377, entitled "System and Computer Program Product For Assisting a User in the Process of Creating Software Code", filed Sep. 17, 2007.

FIELD OF THE INVENTION

The present invention relates generally to data processing, and more particularly to techniques for assisting a user in creating software code (e.g., a query).

BACKGROUND OF THE INVENTION

Software code, in general, can be difficult to write. For example, with regard to XML Query Language (XQuery), the difficulty can be partly due to unfamiliar query constructs, query syntax, and/or query construction logic. Query constructs include all of the elements—e.g., functions and expressions—that can be used to build a query. Query syntax refers to rules that determine how the query constructs can be combined to create a query. Query construction logic is required to combine query constructs using query syntax in a meaningful way, so that the query returns a desired result. Conventional query building tools are generally sufficient for intermediate to advanced users, but are typically inadequate for novice users.

BRIEF SUMMARY OF THE INVENTION

In general, this specification describes a method for assisting a user in creating software code. The method includes receiving user input editing software code through a code editor, in which the software code is associated with a programming language having a plurality of software constructs. The method further includes receiving user input invoking a code assistant associated with the code editor. The code assistant comprises a plurality of panels that correspond to the plurality of software constructs. One or more of the plurality of panels contain a set of user-selectable options associated with a given software construct to assist the user in editing the software code.

Implementations can include one or more of the following features. The code assistant can be invokable by the user at any given point in time during editing of the software code. The code assistant can be closable by the user at any given point in time during the editing of the software code. A result of a user selection of an option within a panel of the code assistant can be immediately reflected within the software code being edited through the code editor. Each option within a panel of the code assistant can correspond to a logical branching point during the editing of the software code. The plurality of software constructs can comprise one or more of a function, expression, statement, or declaration associated with the computer program. The programming language can be one of C, C++ Pascal, Basic, Java, JavaScript, Lisp, Structured Query Language (SQL), XML Query Language (XQuery), or a markup language. Each panel of the code assistant can be displayable within a same window on the display as the software code being edited. Each panel of the code assistant can comprise context dependent tabs that reflect user options associated with a given software construct.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for assisting a user in creating software code. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
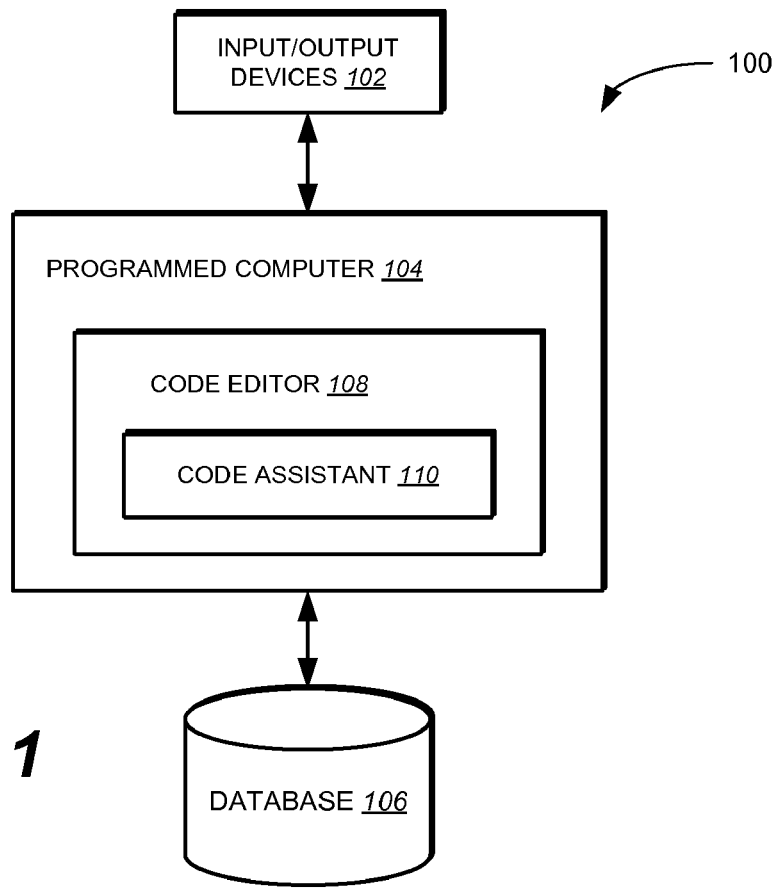
FIG. 1 is a block diagram of a data processing system including a code editor and a code assistant in accordance with one implementation.

FIG. 1 illustrates a data processing system 100 in accordance with one implementation of the invention. The data processing system 100 includes input and output devices 102, a programmed computer 104, and a storage device 106 (e.g., a database). The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on.

Running on the programmed computer 104 is a code editor 108. In one implementation, the code editor 108 is a software component (e.g., a text editor program) that assists users in editing source code of computer programs. The code editor 108 can be a standalone application or can be built into an integrated development environment (IDE). In one implementation, the code editor 108 includes a code assistant 110 that assists a user (e.g., a novice programmer) in writing complex software code by guiding the user through a step-by-step process of programming. In one implementation, the code assistant 110 comprises a panel that is located adjacent to software code that is displayed by the code editor 108 (instead of popping out in a dedicated modal window). In one implementation, (unlike conventional software wizards) the code assistant 110 is invokable by a user at any point during the creation of software code and the user can leave (or close) the code assistant 110 at any point during the creation of the software code. Thus, the code assistant 110 has multiple starting and ending points that are determined (as needed) by the user.

In one implementation, the code assistant 110 assists a user in programming software code by associating each unique software construct—e.g., function, expression, statement, declaration, and so on—with a specific panel, or set of panels (note: the code assistant 110 may present a series of panels as steps that the user must complete in order to complete the creation of the code construct), of the code assistant 110. In one implementation, each panel contains a set of user-selectable options associated with a given software construct. In one implementation, the user-selectable options are logical branching points that lead to different paths during a programming process. Results of a user selection (of an option) within the panel of the code assistant 110 can be immediately reflected within software code being displayed by the code editor 108 (as described and illustrated in greater detail below). Thus, in one implementation, the software code (displayed by the code editor 108) is continually updated with every action/decision made by the user in the panel of the code assistant 110. This permits the user to leave the code assistant 110 at any time—i.e., move from the code assistant 110 to the code editor 108. In one implementation, the opposite is also true. That is, the state of the code assistant 110 is continually updated based on the work the user is doing in the code editor 108, and therefore the user may move from the code editor 108 into the code assistant 110 at any time. This is best viewed in contrast with a conventional code generation wizard that typically can only be invoked at the beginning of creating a piece of code (and not in the middle), and which only updates software code in the editor upon completion of the code generation wizard.

Figure 2:
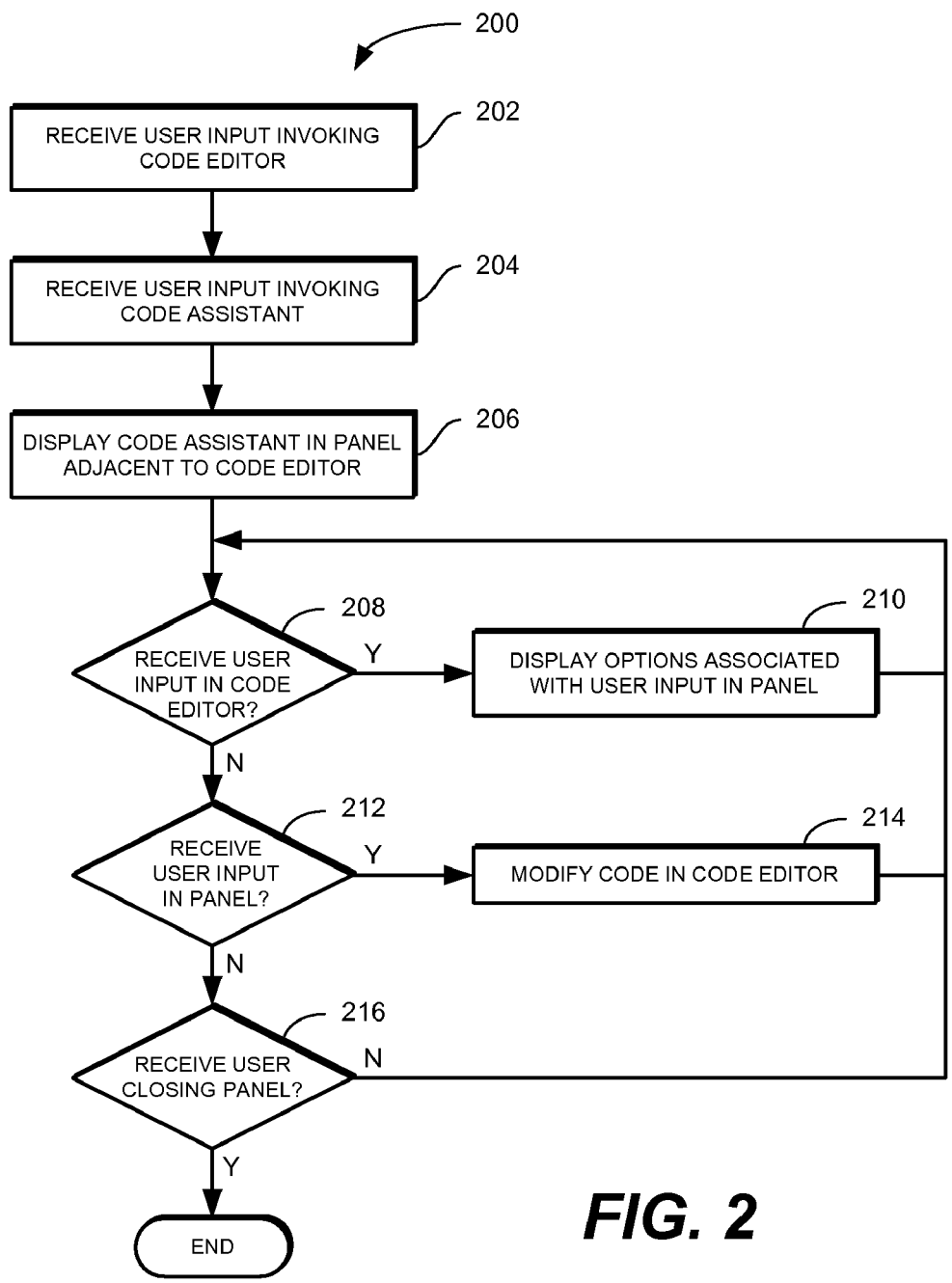
FIG. 2 illustrates one implementation of a method for creating software code using the code editor and the code assistant of FIG. 1.

FIG. 2 illustrates a method 200 for creating software code in accordance with one implementation. User input is received invoking a code editor (e.g., code editor 108 (FIG. 1)) (step 202). The code editor can be any type of text editor program designed to edit source code of a computer program. Examples of software code (e.g., programming languages) that can be created or developed through the code editor include C, C++ Pascal, Basic, Java, JavaScript, Lisp, Structured Query Language (SQL), XML Query Language (XQuery), a markup language, and so on. User input is received invoking a code assistant (e.g., code assistant 110 (FIG. 1)) (step 204). In one implementation, the code assistant is invokable by a user at any point in time during programming. In response to the user invoking the code assistant, the code assistant is displayed within a panel that is adjacent to the software code being created (step 206). In one implementation, the panel (including the code assistant) is displayed to the user within a same window as that of the software code. In one implementation, the panel is displayed in a window that is separate from a window associated with the software code. In one implementation, the code assistant comprises a plurality of panels that each contains a set of user-selectable options associated with a given software construct of the software code.

A determination is made whether user input is received within the code editor (step 208). User input into the code editor can be a user typing one or more software constructs (e.g., a function, expression, statement, declaration, and so on) associated with a given programming language. Responsive to such user input within the code editor, the code assistant displays one or more options associated with the one or more software constructs (step 210). The code editor generally has a focus. In one implementation, the focus is always on one construct at a time (although that construct may contain others, as in a function). The code assistant displays a panel associated with the focused construct within the code editor. As the code assistant creates new constructs (in response to the user's input), the focus of the code editor may change to the newly created construct. Simultaneously to step 208, a determination is also made whether user input is received within the panel (including the code assistant) (step 212). Responsive to a user input selecting an option within the panel, the software code within the code editor is modified (or updated) to reflect the user selection (step 214). The code assistant is displayed to the user until user input is received that closes the code assistant (step 216). In one implementation, the code assistant can be closed by a user at any given point in time during programming. In one implementation, the code assistant need not be closed for the user to return to the code editor.

Figure 3:
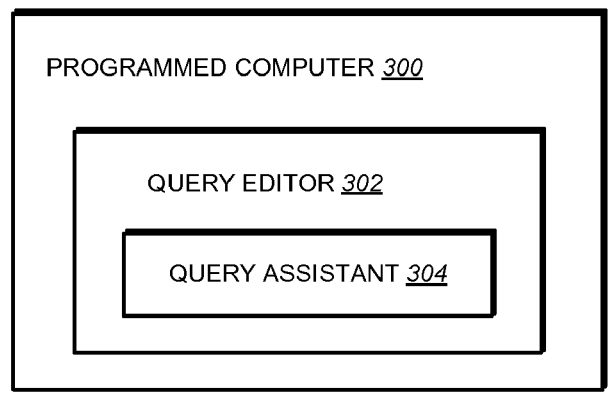
FIG. 3 illustrates one implementation of a data processing system including a query editor and a query assistant.

FIG. 3 illustrates a programmed computer 300 in accordance with one implementation. Running on the programmed computer 300 is a query editor 302 which includes a query assistant 304. The query editor 302 and the query assistant 304 respectively correspond to the code editor 108 (FIG. 1) and the code assistant 110 (FIG. 1), however, the query editor 302 and the query assistant 304 are specifically dedicated to the creation of queries (e.g., in SQL or XQuery). In general, SQL is a programming language designed for the retrieval and management of data in relational database management systems, database schema creation and modification, and database object access control management.

In one implementation, the flexibility of the query assistant 304 (in allowing a user to start or stop using the query assistant 304 at any point during the creation of a query) aids the user in transitioning from a novice skill level to an intermediate and/or advanced skill level, in which use of the query assistant 304 may no longer be needed. Such flexibility is made possible because each decision (or action) made by the user in the query assistant 304 is immediately reflected in the query editor 302, and vice versa (unlike a conventional wizard, in which the product of all of the user's input is not exposed until the wizard is completed). The immediate exposure of interim results acts as timely feedback, which helps the user to avoid costly mistakes and to learn the results of user decisions. Accordingly, the goal of the immediate exposure of results is so that the user can make the same changes to software code—e.g., a query—in the future without the aid of the query assistant 304. In one implementation, a user can move from the query assistant 304 to the query editor 302 and back again at any time during the creation of a given query.

In one implementation, instead of a "modal" interface typical of conventional wizards, the query assistant 304 can be displayed adjacent to the query editor 302 in the same window. Also unlike the typical wizard, the query assistant 304 exposes the logic behind building a query. Each unique query construct (e.g., function or expression) in the query editor 302 is associated with a specific panel, or set of panels, in the query assistant 304. In one implementation, some panels may contain a set of options associated with the selected query construct. These options are the logical branching points leading to different paths in the query building process, also known as "task paths". Other panels may contain tools to enable a user to create a given construct. For example, one panel can contain a column selection tool. After selecting a construct in the query editor 302, the user sees the options available for the construct in the query assistant 304. A user can then select an option that matches a desired goal by reading a description of each option that is embedded within the query assistant 304.

After selecting an option, a user can proceed down the task path (e.g., by clicking a "next" button). Clicking "next" replaces the options panel with the first panel in the series of panels designed to help the user accomplish the selected options (action) on the selected construct. The path may contain one or more steps, each being represented by a user interface panel. Some panels may contain one or more user interface controls which allow the user to input information relevant to the task that the user is trying to accomplish. Using these controls, the user modifies the selected query construct. A modification might result in the creation of sub-constructs. Each newly created sub-construct is immediately reflected in the query code editor, where the user can select the sub-construct to see a panel in the code assistant containing options associated with its type.

In one implementation, instead of selecting a sub-construct (by clicking on the sub-construct with a mouse within the query editor 302), a user can view and select sub-constructs within the query assistant 304. For example, each sub-construct associated with a selected construct (in the query editor 302) can be exposed within a set of tabs (described in greater detail below) that are displayed within the query assistant 304. To select a sub-construct within the query assistant 304, a user can first select a given tab, and then select a sub-construct within the tab. To view an options panel associated with the selected sub-construct, the user can click a button associated with the sub-construct, and thus focus the query assistant 304 on that sub-construct (the available options and the tabs can change to reflect the new focus). Accordingly, by choosing an option and following task paths, creating sub-constructs and focusing on the sub-constructs to see more options, a user is lead step-by-step through a complex process of creating a query (e.g., in SQL or XQuery). In this way, a complex query building process which would be very difficult to accommodate in a wizard is easily modeled by the query assistant 304. And, as the novice user incrementally makes the decisions which together lead to the desired query, the user learns how to make these decisions in the future without the help of the query assistant 304. The user can then work more efficiently in the query editor 302 as an intermediate or advanced user.

Figure 4A:
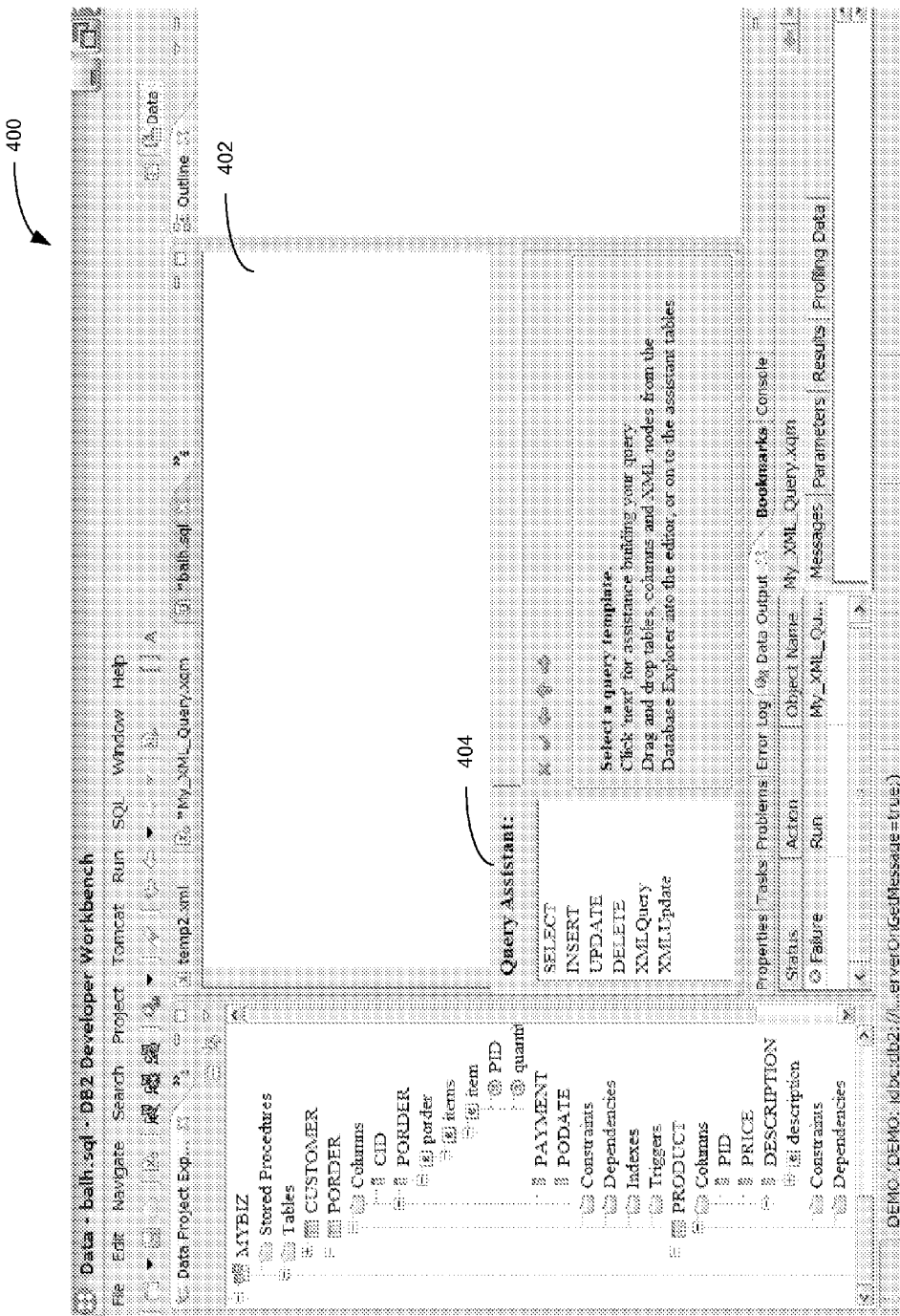
FIGS. 4A-4G illustrate a screen shot of an exemplary user interface including the query editor and the query assistant of FIG. 3.
Figure 4B:
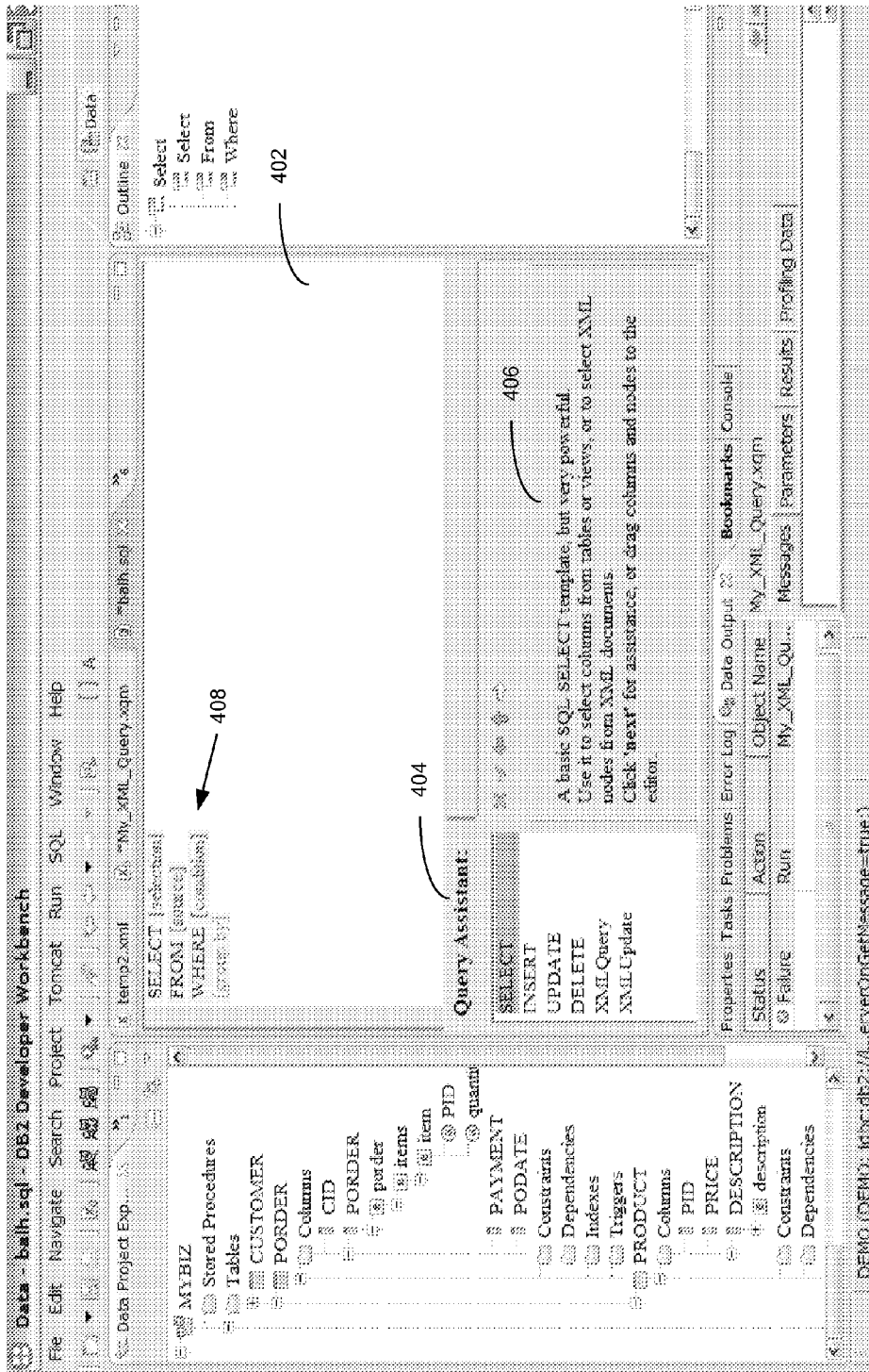

FIGS. 4A-4G illustrate an example user interface 400 including a query editor 402 and a query assistant 404 in accordance with one implementation. Referring first to FIG. 4A, the query assistant 404 starts with a list of options—e.g., SELECT, INSERT, UPDATE, DELETE, XML Query, XML Update. In one implementation, each of these options corresponds to a query template. As shown in FIG. 4B, responsive to a user selecting the SELECT option within the query assistant 404, a description 406 of a query template (corresponding to the SELECT option) is displayed in the query assistant 404, and a SELECT template 408 appears in the query editor 402.

Figure 4C:
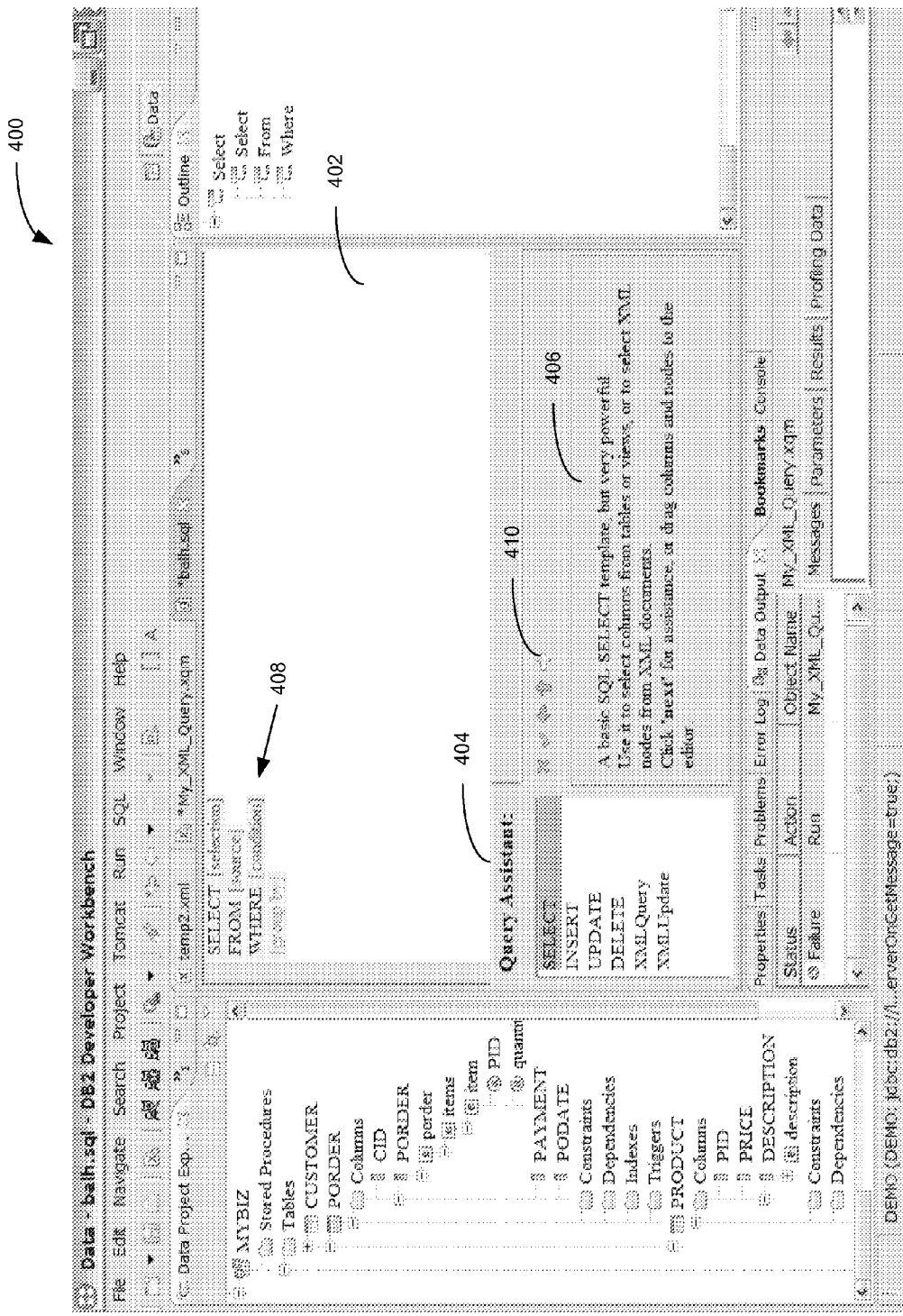

Referring to FIG. 4C, at this point, the user may choose to work in one of three modes. In a first mode, an advanced user may prefer to work in the query editor 402 itself with a content assist mechanism as typically found in conventional editors, or with "template blocks" (e.g., SELECT template 408) as shown in the query editor 402. In one implementation, each query template may contain multiple template blocks held together by keywords that are part of the query language. Template blocks are place holders within a software code template which must be replaced with appropriate software code in order for the template to be completed. For example, the basic SQL "select" template may appears as follows: "SELECT [selection] FROM [source] WHERE [condition]". The words in upper case are the query keywords, and the words in blocks are the template blocks. Each template block represents an expected (required) or optional query construct (optional template blocks can be differentiated from required ones by their color, or their font properties). Each template block is a visual cue that indicates to the user that something is required in the query, or may optionally be added to the query as needed. In one implementation, there is a color difference between those template blocks that represent required information and those that are optional—e.g., optional template blocks are gray, while required template blocks are green.

Generally, each template block is an invocation point for user assistance. In one implementation, a user can select a template block to see a list of the valid options for that particular template block in the query assistant 404. An option might invoke a specific panel in the query assistant 404 responsible for creating the type of query construct represented tentatively by the template block. Thus, some template blocks can represent a class of query constructs. In this case, the options available on that template block (within the query assistant 404) would allow the user to create the query constructs. When selected, a new construct would replace the template block in the query code. In some cases, the newly created construct will itself be a template containing template blocks. For example, given the SQL select template, "SELECT [selection] FROM [source] WHERE [condition]", the options for the "[selection]" template block might include the following: "column, XML Query, sub-select", etc. And, selecting the "XML Query" option would replace the "[selection]" template block with an XMLQuery template including its template blocks, resulting in the following: "SELECT XMLQuery([namespace,] [for or let] [where condition] [order by] return [result]) FROM [source] where [condition]". The template blocks within the query are context dependent, meaning they "know" each other. For example, the options available on the "[condition]" template block, in the select template are modified when selecting from an XML Query. In this context, the query builder knows that the user will likely want to qualify the XML source before it is passed into the XMLQuery function, with the "XMLExists" function. For this reason, in one implementation, the query assistant 404 lists such options first when invoked on the "[condition]" template block.

In some cases, a template block can be replaced by a single other template block of a more specific nature. For example, in the SQL select template, "SELECT [selection] FROM [source] WHERE [condition]", the options for the "[source]" template block can include the following: "table, XMLTable, function", etc. Selecting the "function" option would replace the "[source]" template block with the "[function]" template block. Because the user probably doesn't want to stop here, the query builder tool automatically invokes a panel in the query assistant 404 that is associated with the new "[function]" template block, and allows the user to choose from a list of function types. The newly selected function type is also represented as a template block, replacing the "[function]" template block. A panel within the query assistant 404 is again automatically invoked, listing the function of the selected type. The user then selects the desired function, and the function template is inserted in place of the template block. The new function template also contains template blocks in place of the required, and optional function parameters.

The user may choose not to use a panel in the query assistant 404 that is associated with the template blocks. Instead, the user may choose to type directly into the editor window—e.g., the query editor 402. In such a case, text entered before the template block is evaluated to determine what it is, then if the text is found to be a valid replacement to the template block, the template block is removed. In one implementation, when the text cursor reaches a template block, the cursor skips the template block. If the user is moving the cursor from the left to the right by using the right arrow keys, when the cursor reaches a template block, the block is selected (highlighted), but the cursor remains where it is (to the left of the template block). With the template block selected, clicking the right-arrow key again moves the cursor to the other side of the template block (unselecting the template block). This works the same in reverse, moving right to left. With the template block selected, typing anything immediately replaces the template block. Selecting a template block can also invoke GUI tools related to the type of the selected template block. With the template block highlighted, clicking the "tab" button moves the selection to the succeeding template block.

Working in this way, replacing template blocks with new templates containing new template blocks or replacing them with more specific template blocks and query code, the user works to replace all of the required template blocks with query code. When all required template blocks are replaced, the query is a valid query and can be run. The optional template blocks remain, as cues to help the user understand how the query can be expanded to meet new/different query goals. When the user advances in query writing skills to the point where the user no longer needs the template blocks as cues, the user can turn off the template blocks and see only the query code.

Figure 4D:
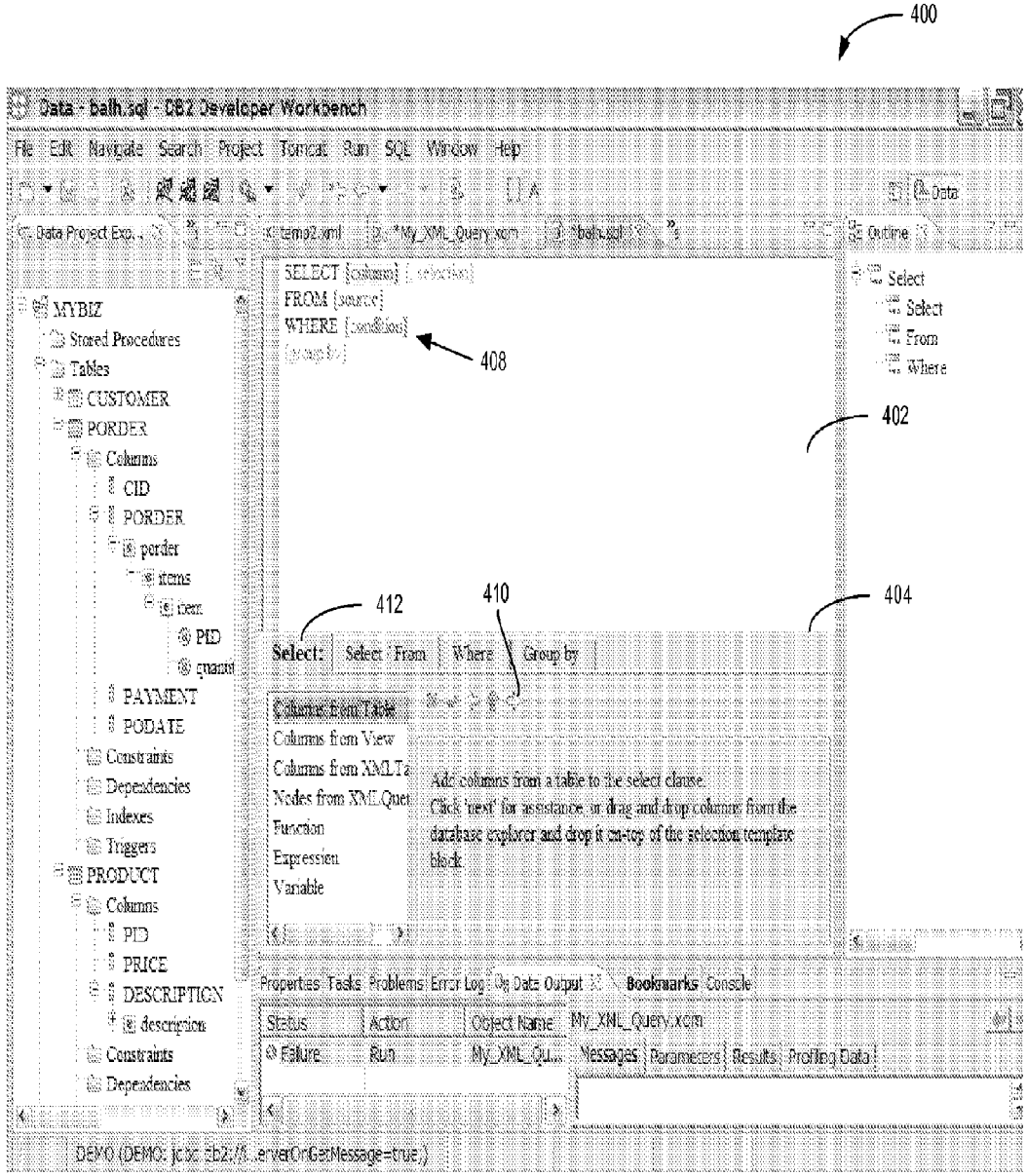

In a second mode, a novice user can continue to work within the query assistant 404 to create a query step-by-step. In one implementation, a user can create a query step-by-step within the query assistant 404 by clicking a next button (in the form of an arrow 410 in the example of FIG. 4C). In a third mode, a user can place a mouse cursor within the query editor 402, thereby revealing context dependent tabs 412 (e.g., Select, Select/From, Where, Group by) within the query assistant 404 (as shown in FIG. 4D). The user can then use the context dependent tabs 412 to complete the query. In general, a user can employ all of the modes discussed above, depending on what the user is trying to accomplish and depending upon the user's comfort level with query concepts, constructs, logic, and so on.

As shown in FIG. 4D, responsive to a user selecting the Select tab and then clicking the arrow 410 (within the query assistant 404), the user is presented with another set of options that pertain to the select template 408. In the example of FIG. 4D, the user selects the select "Columns from Table" option, and can view a description of the selection within the query assistant 404. In one implementation, the selected tab (of the context dependent tabs 412) contains a list of options that are related to the object (e.g., construct or sub-construct) in focus. The other tabs are views of the different aspects of the object in focus. In one implementation, each tab/view contains controls that allow a user to more easily and efficiently manipulate the object in focus.

Figure 4E:
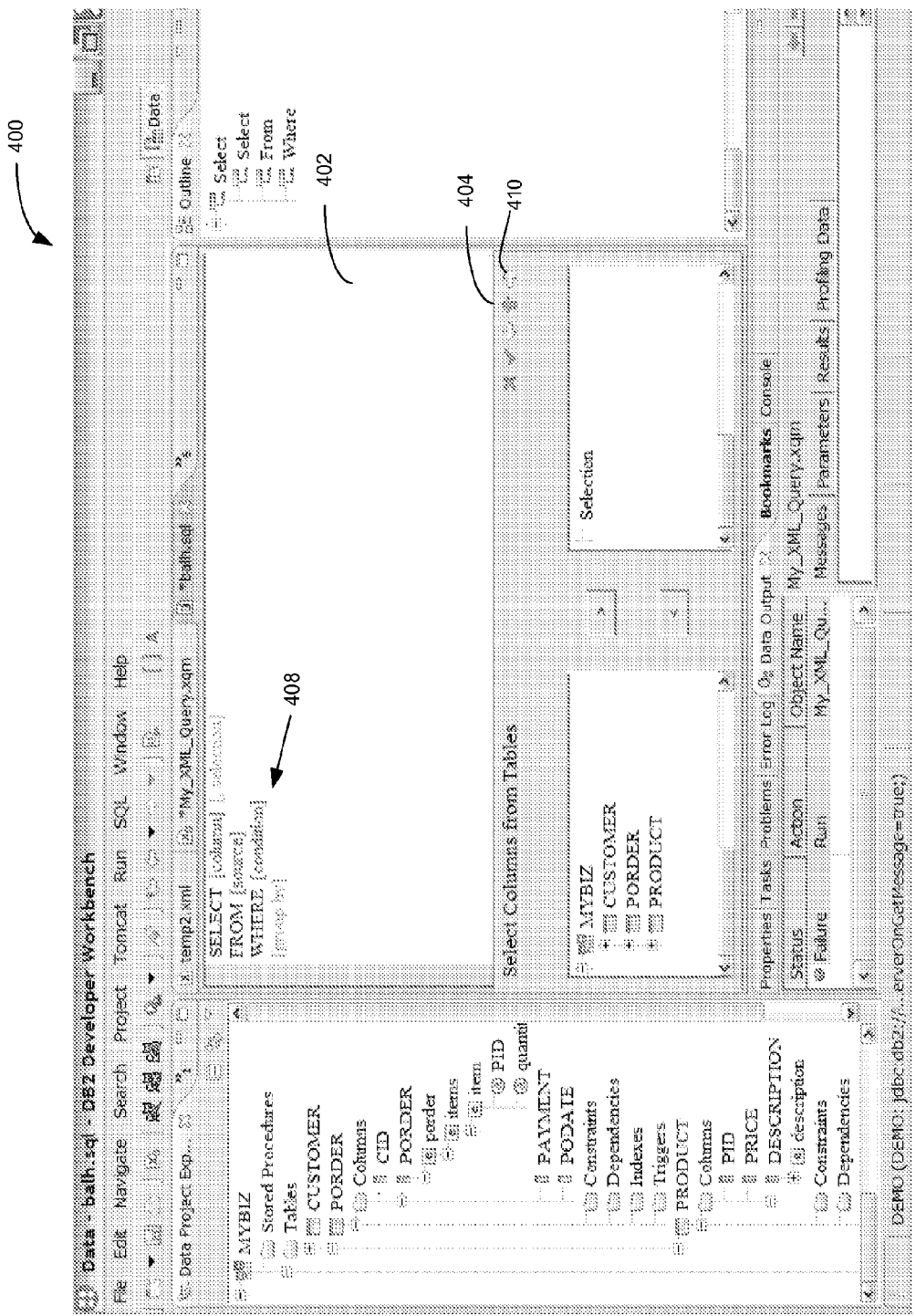

As shown in FIG. 4E, responsive to the user clicking on the arrow 410, (in one implementation) the user is taken to a panel in which the user can select columns from tables—e.g., CUSTOMER, PORDER, PRODUCT. In the example of FIGS. 4A-4E, the route to receiving user input selecting columns from a table (to be searched by a query) was relatively short, however, in other cases, the route could be long and involve many steps. For example, some task paths contain a list of options that lead to sub-sub-routes. Such branching of paths and routes would be difficult and awkward to contain in a wizard, but it works well with the query assistant 404 because the result of each decision made by the user is immediately reflected in the query code contained in the query editor 402 so that the user can close the query assistant and go it alone whenever the user feels comfortable. Users can, therefore, avoid the nasty feeling of being stuck in a long and complex wizard. In one implementation, the user need not close the query assistant 404 in order to work within the editor.

Figure 4F:
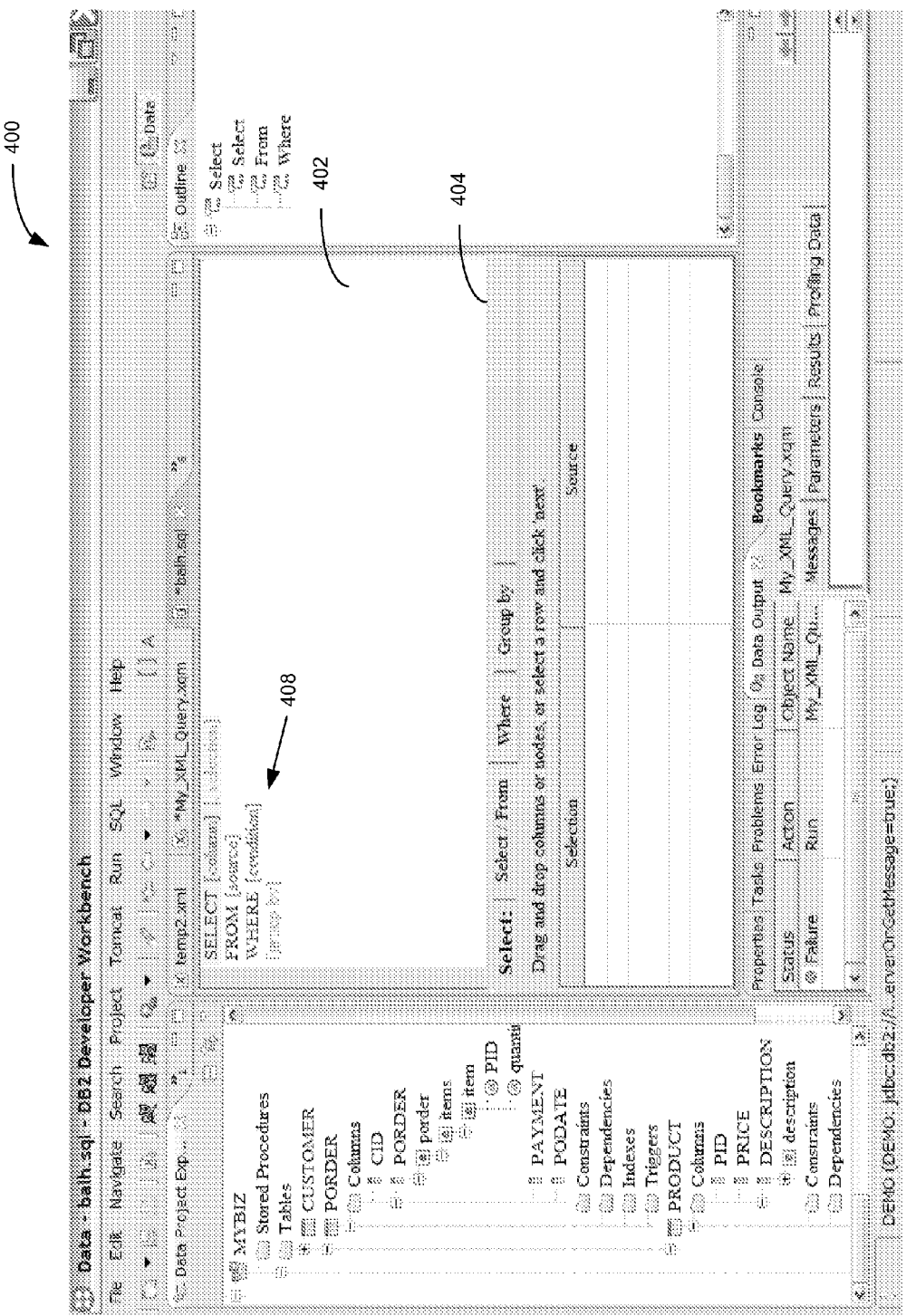
Figure 4G:
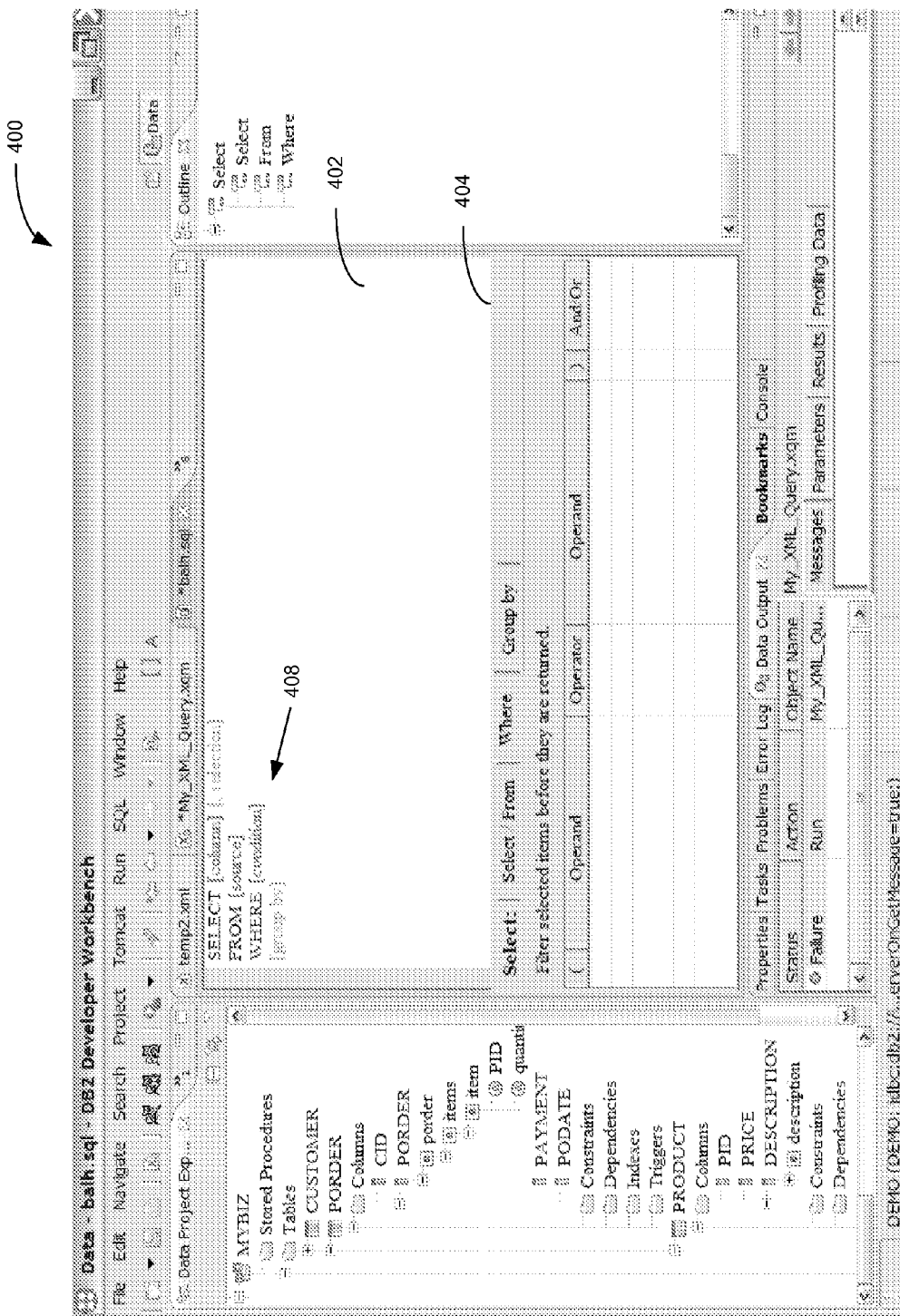

In one implementation, instead of creating a query through a step-by-step method (in which a user successively clicks "next" and/or chooses an option from a list of alternatives), a user can select any of the other tabs of the context dependent tabs 412. For example, as shown in FIG. 4F, the user has selected the "Select/From" tab which permits the user to easily manipulate the Select and the From clause (associated with the select template 408) at once. In FIG. 4G, the user has selected the "Where" tab to manipulate the where clause (associated with the select template 408).

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 5:
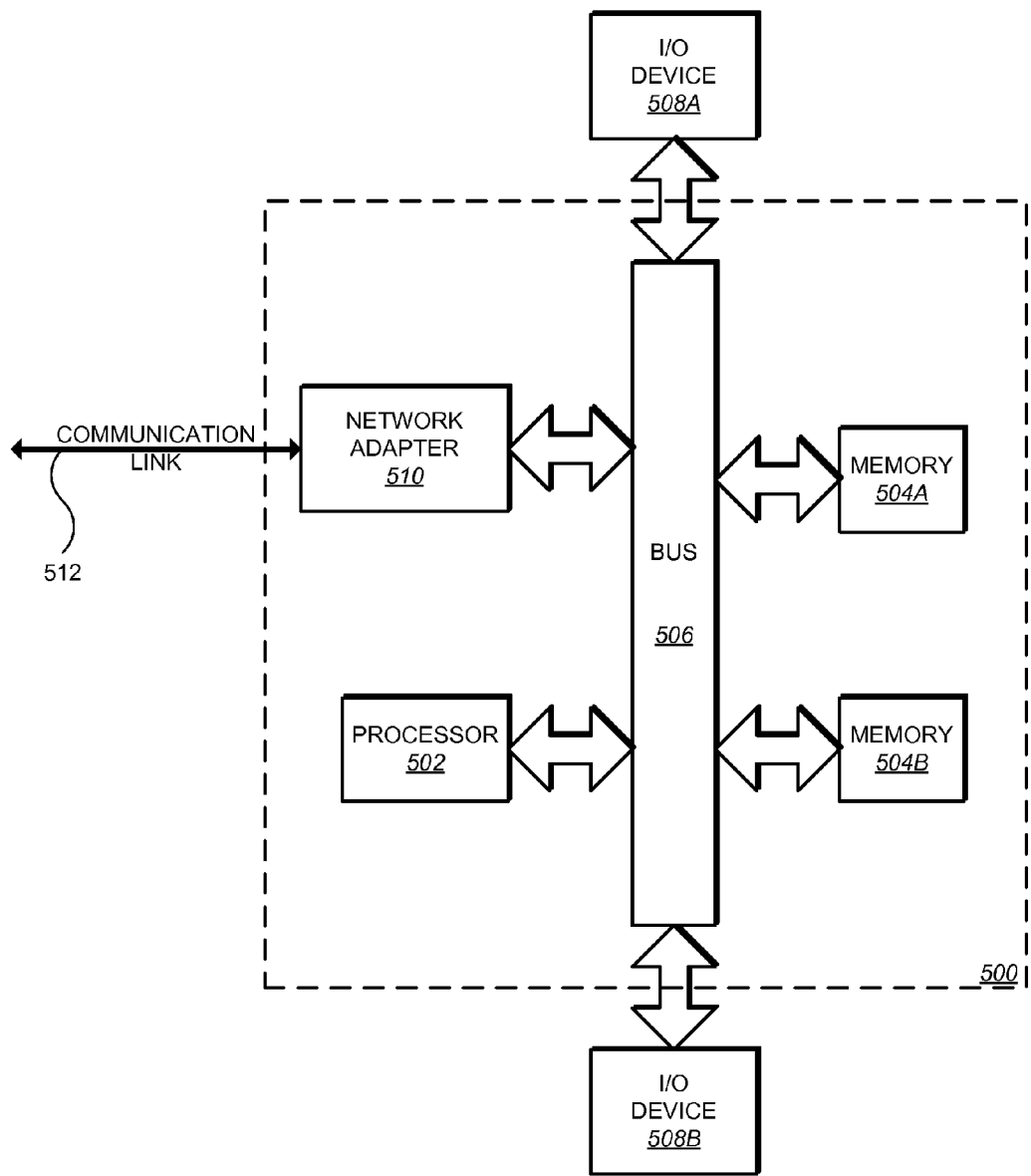
FIG. 5 is a block diagram of a data processing system suitable for assisting a user in creating software code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Various implementations for assisting a user in creating software code have been described. Nevertheless, various modifications may be made to the implementations. For example, though the techniques described above refer to creating SQL code, the techniques are applicable to the creation and development of other programming languages. In addition, steps of the methods described above can be performed in a different order and still achieve desirable results. Accordingly, many modifications may be made without departing from the scope of the following claims.

What is claimed is:

1. A method for assisting a user in creating software code, the method comprising:

receiving user input editing software code through a code editor, the software code being associated with a programming language having a plurality of software constructs, wherein at least one software construct includes one or more invocation points each for receiving user-provided information;

receiving user input invoking a code assistant associated with the code editor, the code assistant comprising a plurality of panels that correspond to the plurality of software constructs, one or more of the plurality of panels containing a set of user-selectable options associated with the one or more invocation points of the software constructs to assist the user in editing the software constructs;

receiving selected options for the software constructs from the one or more panels and enabling creation of one or more sub-constructs within the software constructs, the one or more of the plurality of panels containing a set of user-selectable options associated with the sub-constructs to assist the user in editing the sub-constructs; and synchronizing the code assistant and code editor in response to each selection of the user-selectable option for an invocation point within the code assistant and each edit of an invocation point of the software constructs entered within the code editor to enable selective switching between the code editor and code assistant during modification of a given software construct to retrieve information for at least one invocation point for the given software construct from the code editor and a user-selectable option for at least one other invocation point of the given software construct from the code assistant.

2. The method of claim 1, wherein the code assistant is invokable by the user at any given point in time during editing of the software code.

3. The method of claim 2, wherein the code assistant is closable by the user at any given point in time during the editing of the software code.

4. The method of claim 1, wherein said synchronizing further comprises immediately reflecting a result of a user selection of an option within a panel of the code assistant within the software code being edited through the code editor.

5. The method of claim 4, wherein each option within a panel of the code assistant corresponds to a logical branching point during the editing of the software code.

6. The method of claim 1, wherein the plurality of software constructs comprise one or more of a function, expression, statement, and declaration associated with a computer program.

7. The method of claim 6, wherein the programming language is one of C, C++, Pascal, Basic, Java, JavaScript, Lisp, Structured Query Language (SQL), and a markup language.

8. The method of claim 1, further comprising displaying each panel of the code assistant within a same window on a display as the software code being edited.

9. The method of claim 1, wherein each panel of the code assistant comprises context dependent tabs that reflect user options for an associated software construct.

* * * * *